May 3, 1927.  E. W. HAWARD  1,627,033
ANTISPLASH DEVICE FOR THE WHEELS OF MOTOR ROAD VEHICLES
Filed Aug. 11, 1925   5 Sheets-Sheet 1
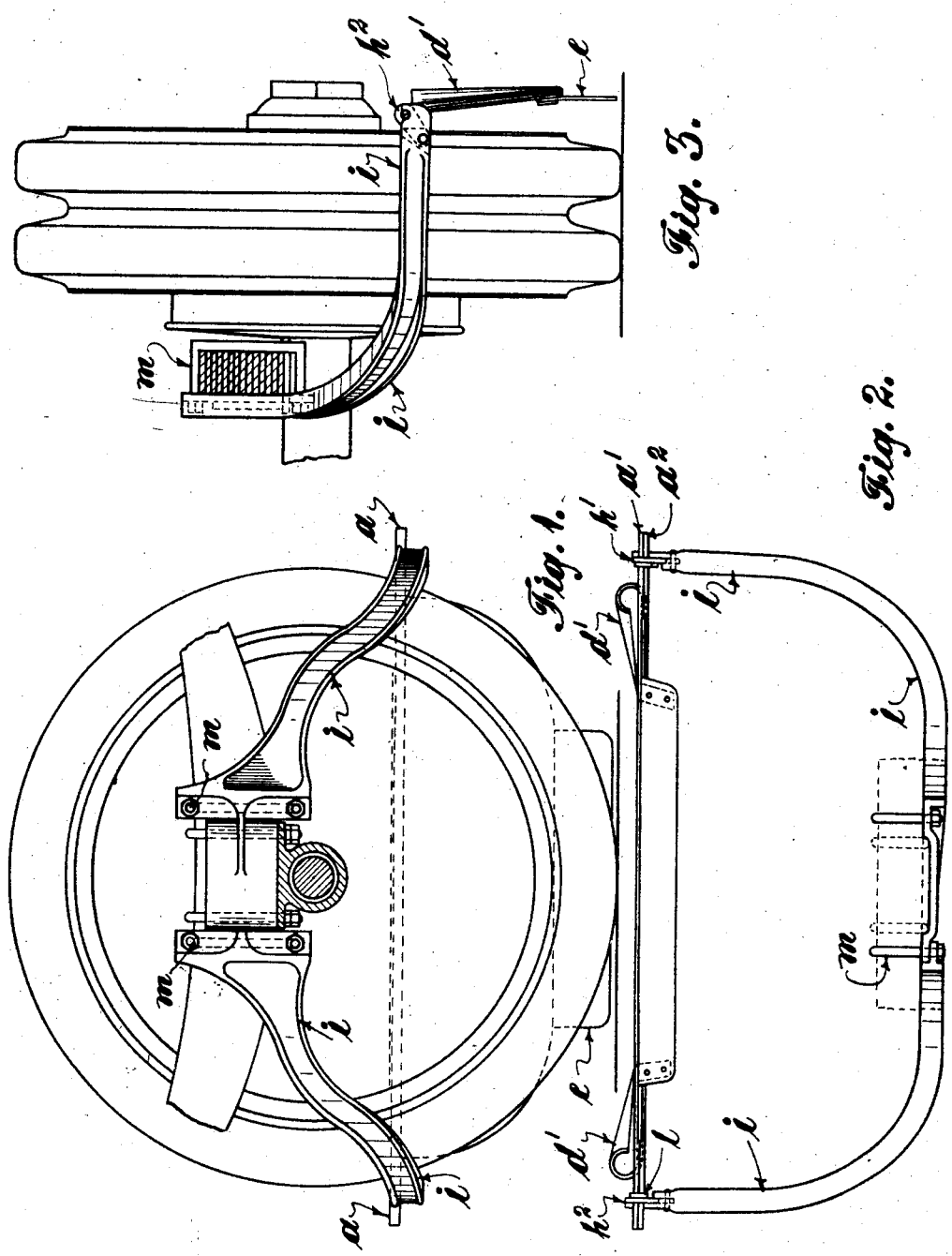
Inventor:-
Ernest William Haward
By his Attorney:- Walter Gunn May 3, 1927.  1,627,033
E. W. HAWARD
ANTISPLASH DEVICE FOR THE WHEELS OF MOTOR ROAD VEHICLES
Filed Aug. 11, 1925      5 Sheets-Sheet 2
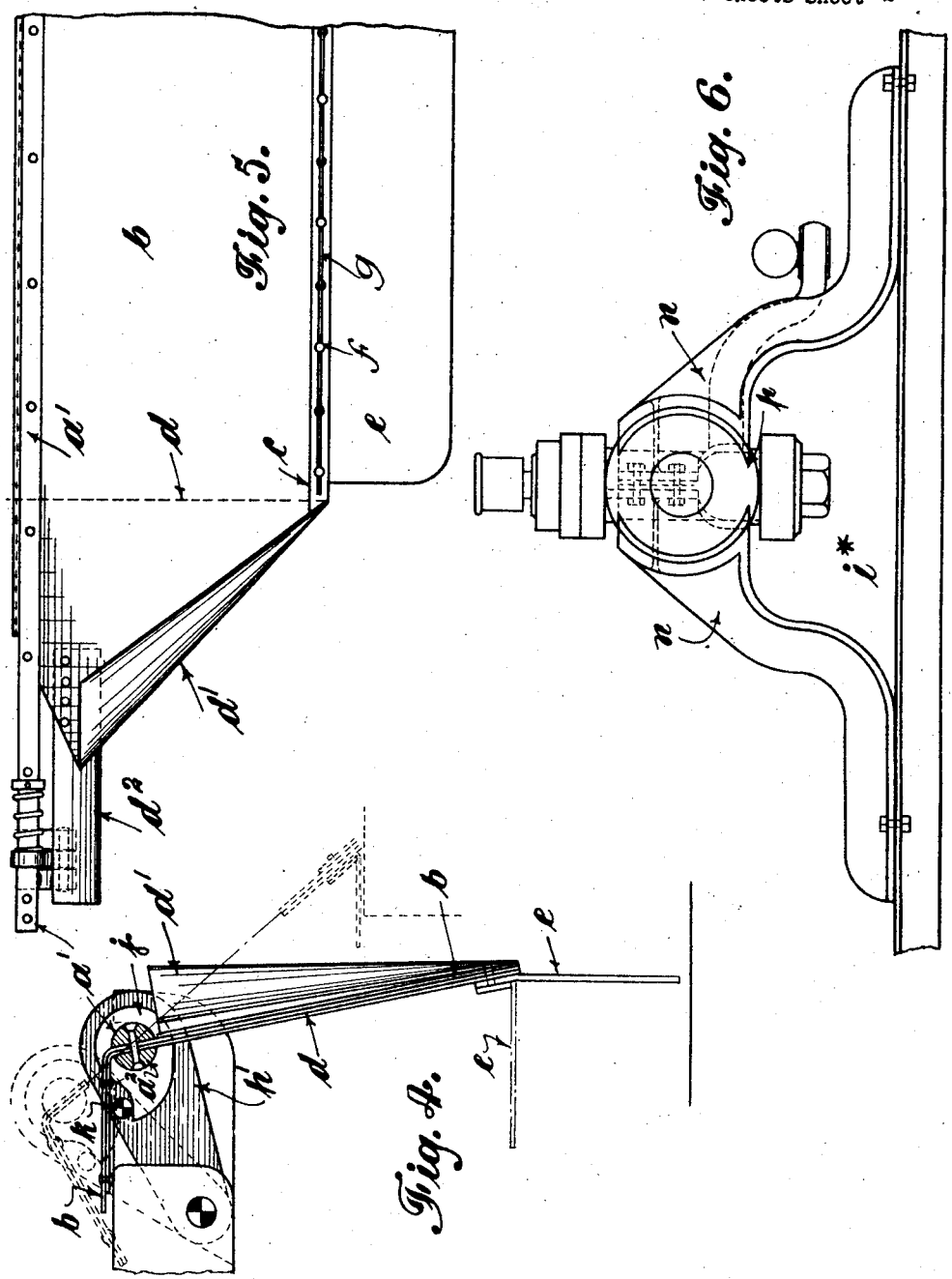
Inventor:-
Ernest William Haward
By his Attorney:- Walter Gunn

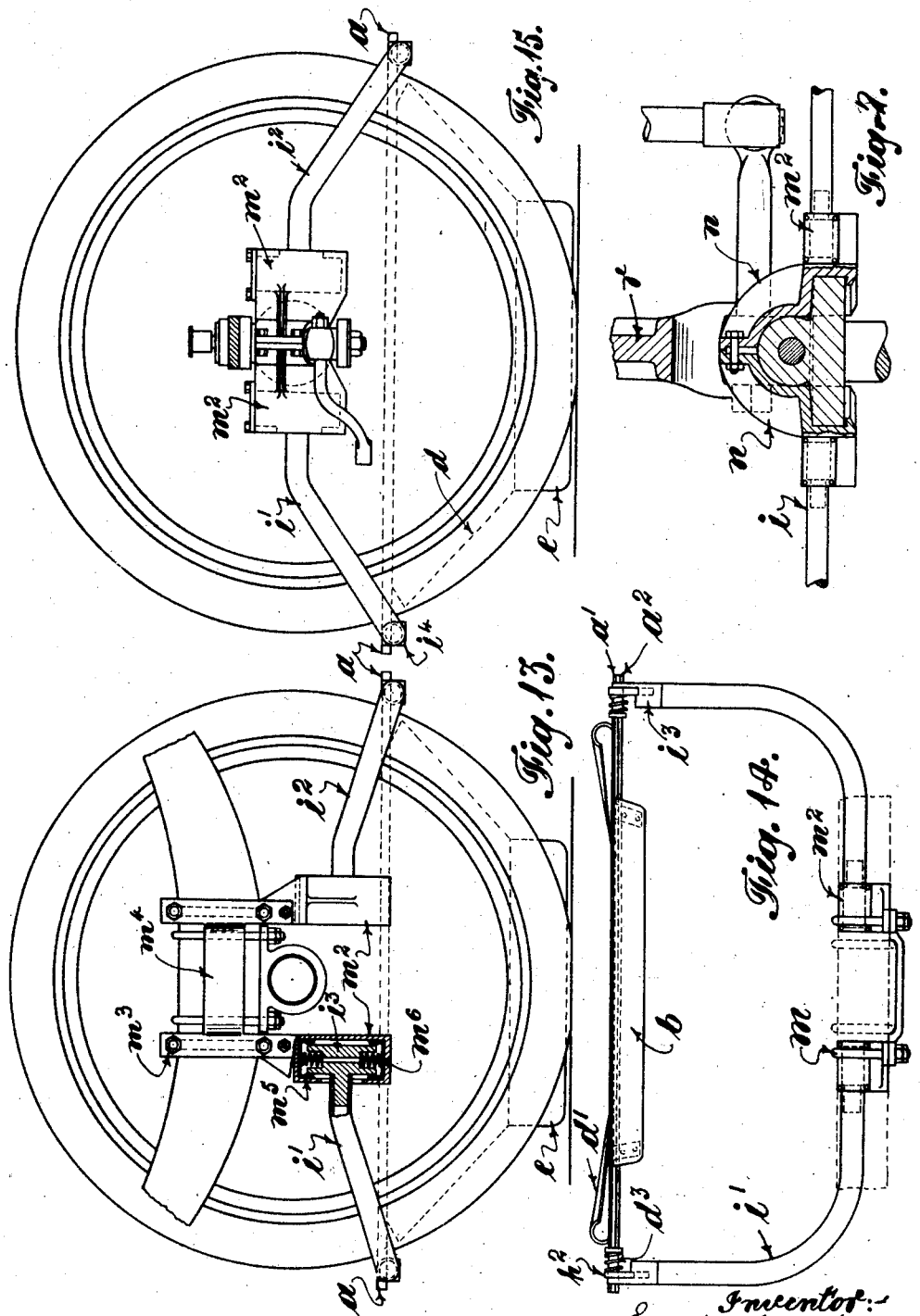

May 3, 1927.                                             1,627,033
E. W. HAWARD
ANTISPLASH DEVICE FOR THE WHEELS OF MOTOR ROAD VEHICLES
Filed Aug. 11, 1925      5 Sheets-Sheet 4
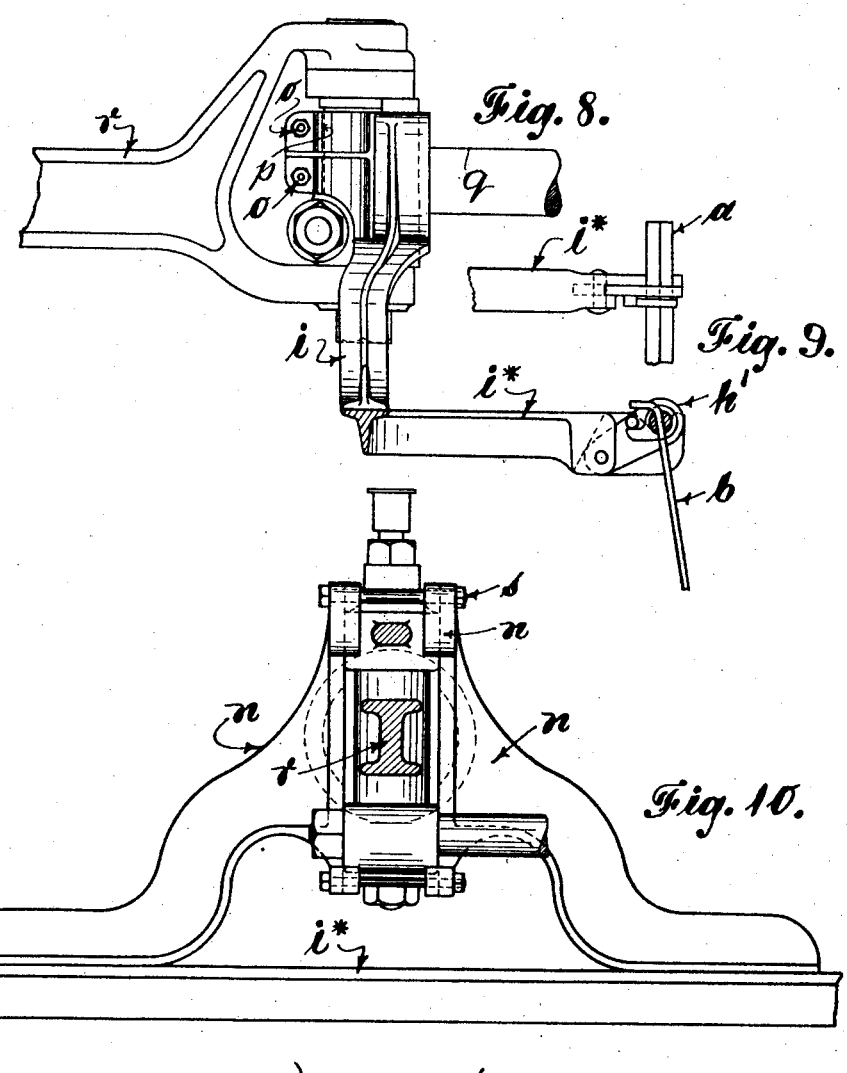
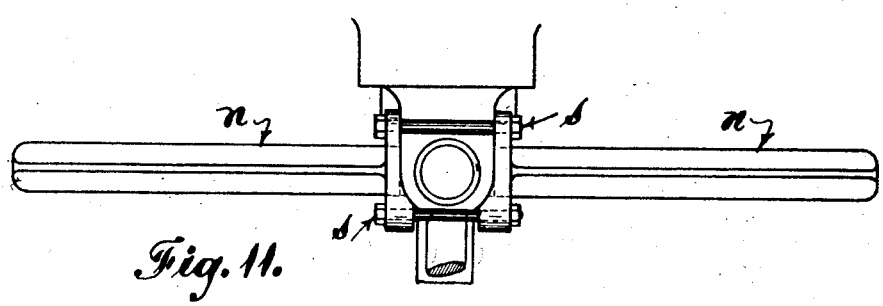
Inventor:
Ernest William Haward
By his Attorney: Walter Gunn May 3, 1927. 1,627,033
E. W. HAWARD
ANTISPLASH DEVICE FOR THE WHEELS OF MOTOR ROAD VEHICLES
Filed Aug. 11, 1925 5 Sheets-Sheet 5
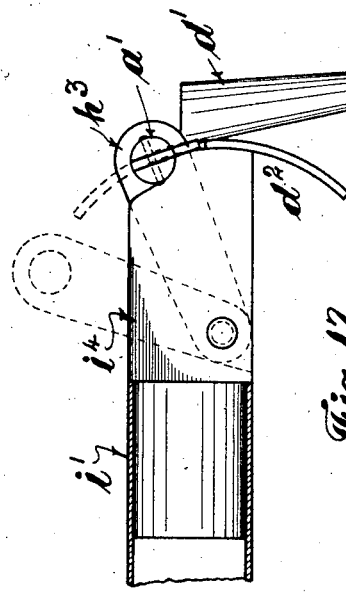
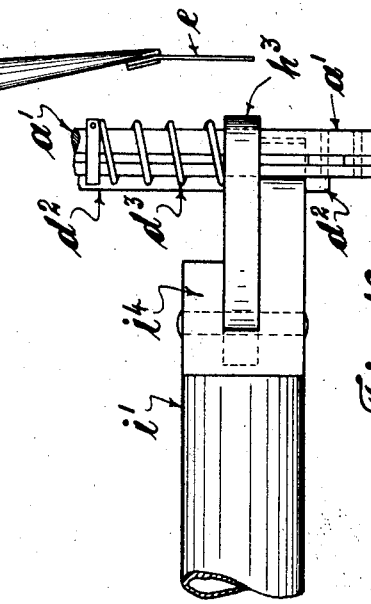
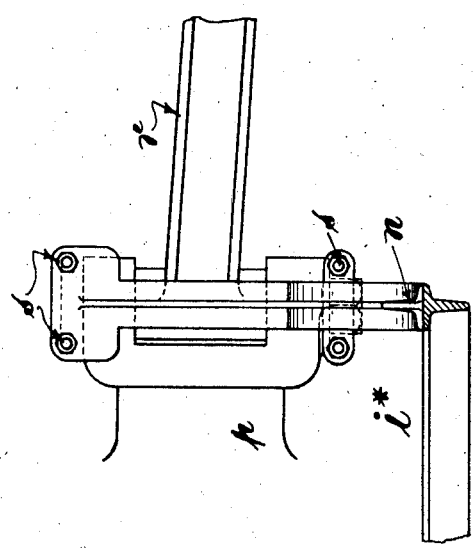

Patented May 3, 1927.

1,627,033

UNITED STATES PATENT OFFICE.

ERNEST WILLIAM HAWARD, OF OLD TRAFFORD, ENGLAND.

ANTISPLASH DEVICE FOR THE WHEELS OF MOTOR ROAD VEHICLES.

Application filed August 11, 1925, Serial No. 49,630, and in Great Britain August 11, 1924.

This invention refers to appliances for protecting pedestrians, etc., from splashing by the wheels of road vehicles, and in particular heavy commercial vehicles.

The object of the invention is to provide appliances which are more or less standard and suitable for the rear and front wheels of various types of vehicles, which are comparatively light in weight, which lie compactly alongside the wheels, which effectively prevent mud, etc., from splashing outwards, and which on striking a curb or meeting an obstruction readily yield without damage to themselves or the wheels.

The invention will be described with the aid of the accompanying drawings, wherein:—

Fig. 1 is an inside face view of the rear wheel of a vehicle, with one example of the improved guard applied thereto, the view being intended to show the manner of fixing the guard to the vehicle spring.

Fig. 2 is a plan of the guard shown in Fig. 1.

Fig. 3 is an end view.

Fig. 4 is an enlarged cross sectional elevation and

Fig. 5 is an enlarged part side view of the guard proper.

Figs. 6, 7 and 8 are an outside elevation, a sectional plan, and an end elevation respectively, of the parts which secure the guard to the stub-axle boss of front wheel axles of the fixed jaw type.

Fig. 9 is a plan of a part of the guard shown in Fig. 8.

Figs. 10, 11 and 12 are an inside elevation, a plan, and end view respectively of the parts which secure the guard to the stub axle boss of front wheel axles of the swivel jaw type.

Fig. 13 is a further inside face view, and

Fig. 14 is a plan of a rear wheel, with another example of the invention applied thereto.

Fig. 15 is an inside face view of a front wheel with the modification shown in Fig. 13 applied thereto.

Fig. 16 is a side view and

Fig. 17 a plan of a detail part of Fig. 13 drawn to a larger scale.

Referring to Figs. 1 to 5, $a^1$, $a^2$ are two half-round rods or bars, between which the guard proper is clamped, the two rods or bars, after the guard is inserted between them being riveted together at intervals, see Figs. 4 and 5. The guard is built up of a sheet of compressed pulp or fibre $b$, reinforced along its edges by a thin metal plate $c$. At its upper end the guard is bent downwards and towards the vehicle, and thereby providing both a side and a top guard, see Figs. 2 and 4.

At each end of the lower part of the guard is a metal plate $d$, the edge of which is curled over to form a tapered roll $d^1$, which gives to the guard a curved shape at each end and forms a guard protector. To the lower edge of the guard is attached the rubber flap $e$, preferably by means of studs $f$ having transverse holes, and a rod or wire $g$ threaded through said holes, see Fig. 5. Any other and suitable means may be used to connect the rubber flap. The half rods or bars $a^1$, $a^2$ besides forming a clamp also collectively form a supporting axle with which the guard may rotate, and said bars, when connected to each other are journaled in two short levers $h^1$, $h^2$ pivoted to the extremities of two relatively stationary arms $i, i$. The axle bars extend beyond said arms, and normally rest in recesses in the arms, see Fig. 4.

By means of a claw or projection $j$ on the axle bar, and a pin $k$ on the lever $h^1$, the guard is caused normally to lie at an angle to the vertical, see Fig. 4, the lower edge being furthest from the vehicle wheel.

The levers $h^1$, $h^2$ lie in the bifurcations of the forked ends of the arms $i$, $i$ and the bottom of the bifurcation forms a stop for the levers when raised to the position shown dotted in Fig. 5. One limb of each fork is shortened (see Fig. 9) to allow room for the claw $j$ and pin $k$ and for a cotter $l$, see Fig. 2, which latter serves to prevent endwise movement of the guard until requiring to detach same from the supporting arms.

In the case of a rear wheel, the arms $i, i$ are curved and extend to points near to the vehicle spring, where they are broadened out and provided with bolt holes to receive bolts $m$, by which they are clamped to the spring, see Figs. 1, 2 and 3. The arms $i, i$ extend downwardly from the point of connection with the spring and forwardly of and to the rear of the wheel respectively, their extremities projecting only slightly beyond the outer face of the wheel, see Fig. 3.

In the case of a front wheel, the arms $i, i$ form part of a single three-sided frame or bracket $i$ which extends behind the wheel and below the axle of same, and at such point is secured to a pair of brackets or clamps $n$, $n$ which lie to right and left of the wheel axle, and are adapted to fit against and with the aid of bolts and nuts $o$, $o$ grip the steering pivot $p$ of the front wheel stub axle $q$, see Figs. 6, 7 and 8. In the example shown in Figs. 6, 7 and 8 the vehicle front wheel axle bar $r$ is of the fixed jaw type. In the example shown in Figs. 10, 11 and 12, the axle bar $r$ is of the swivel jaw type, and the box of the front wheel stub axle is forked to engage the axle bar. In this latter case the brackets $n$, $n$ are clamped to the top and bottom parts of the boss, and the brackets at such points are parallel sided and are held together by bolts and nuts $s$, $s$.

In either arrangement of stub axle boss, the manner of fixing the brackets thereto, is such as to ensure of the brackets and guard swivelling with the wheel, and of always maintaining a correct position relatively to the wheel, as the latter swivels to right or left under the control of the vehicle steering gear.

The action of the improved anti-splash guards is as follows:—Assuming the guards are at rest, they all lie with the lower edge further away from the plane of the wheel than the top edge, i. e. inclined outwardly. In such position they effectually intercept any mud or water, thrown up by the wheels. In the event of the forward end of a guard meeting an obstruction (and similarly the rear end when reversing) the inclination of the guard, together with its curved and rounded edge, causes the guard to rise upwards and outwardly and pass safely over the obstruction, the guard instantly moving down by gravity as soon as the obstruction is passed. In the event of the guard coming into contact with a curb, it operates in a similar manner, the guard first mounting the curb by reason of the curved and rounded edge and then moving outwards as the vehicle comes nearer the curb, or the depth of the curb increases, see Fig. 4. In this way little or no damage can be done to the guard, by striking any ordinary obstruction or curb and the guard remains effective for long periods.

To detach a guard when requiring to gain access to the wheel, the pin $l$ is withdrawn and the axle bars $a$, $a$ are merely moved endwise in the arms $i$, $i$ until one end is free, when the movement is reversed and the other end drawn out of its support.

Instead of being mounted in levers $h^1$, $h^2$ the axle bar of the guard may be journaled directly in the ends of the arms $i$, $i$ which may be rigid or provided with rule joints, suitable for enabling the arms to turn up, when required.

Although preferring to make the guard of compressed paper pulp or fibre, which is comparatively light, yet strong, it may be made of any other and suitable material.

The means for limiting the angular movements of the guard may also vary, the main requirement being to hold the guard at an angle to the vertical and to leave the guard free to move upwardly and outwardly on meeting an obstruction.

The angular setting of the guard is of great importance as no matter in what direction the obstruction strikes the guard, within the usual range of forward motion, it always yields upwards and outwardly, thereby avoiding damage to itself or to the obstruction.

In addition to being free to move with the levers $h^1$, $h^2$ about their pivots as axis, the guard is also free when the levers are raised (see Fig. 4) to move about its own axis, and with the levers tending to fall down, the guard is capable of moving outwards to a very wide angle, in fact to a horizontal position.

The bottom edge of the guard will be arranged at a height slightly above that of an ordinary curb, and therefore, only in the case of a deeper curb will there be a chance of the curb touching the guard, and then only to lift it. With the guard lying nearer the wheel than the outer end of the wheel axle cap (see Fig. 3) any sidewise impact will usually be taken by the wheel axle cap, and not by the guard.

Referring now to Figs. 13 to 17, the flap or guard and its axle rod $a$ are hingedly carried at the ends of light gauge weldless steel tubes $i^1$, $i^2$ and such tubes extend from points fore and aft of the wheel where they carry the axle rod $a$, to points near the axle of the wheel, see Fig. 14. Each tube at such end is fitted with a T-shaped metal block $i^3$ see Fig. 13, slidably located in a fixed casing or box $m^2$ rigidly secured to the wheel axle spring. In the case of a rear wheel (Fig. 13) the boxes $m^2$ are each formed with an upward plate like extension $m^3$ capable of fitting against the axle spring, and having holes by which and an H-shaped keep-plate $m^4$ (also formed with holes) and U bolts $m$, the boxes may be firmly bolted to the spring and the boxes held in the correct relative positions.

In the case of a front wheel, see Fig. 15. a similar arrangement of boxes is employed clamped to the stub axle swivelling pivot. To prevent jar and breakage of the boxes by reason of the vibration of the guard, sheet metal springs $m^5$ and spiral spring $m^6$ are introduced into the boxes, see Fig. 13.

The flap or guard $b$ may be formed with a rolled edge $d^1$ at each end but with a straight contour (instead of curved contour) as shown in Figs. 13 and 15.

For enabling the guard to yield upwardly and outwardly, the guard is pivotally suspended between short levels $h^3$ axially supported in forked extremities $i^4$ of the tubular supporting arms $i^1$, $i^2$, see Figs. 16 and 17. The cam and stop pin (Fig. 9) for determining the angle of the guard are dispensed with, and on the guard is a curved plate $d^2$ adapted normally to fit against the curved end of the guard supporting arms, and in the lowest position of the levers hold the guard at an angle to the vertical, whilst on the guard being raised, said curved plate by following the curve of the arm, allows the guard to move upwards, its lower edge simultaneously moving outwards. The lower edge of the curved plate $d^2$ is of a width and length such as not to foul the top faces of the supporting arms when the guard reaches its highest position.

A spring $d^3$ is provided at each end of the guard axle rod to allow of slight endwise movement of the guard and also to help to position the said axle relatively to the supporting arms. In each end of the said axle, which will preferably be in two half parts, is a pivoted metal trigger which serves to engage the arms when the axle is placed in position and hold same against accidental displacement.

What I claim is:—

1. An anti-splash appliance for a road vehicle wheel, comprising a guard of light sheet material, a rotatable axle carrying said guard, a pair of brackets or supports mounted on a relatively fixed part of the vehicle and extending at their lower ends to the back and front of the wheel respectively, short levers pivotally mounted near the ends of the brackets and carrying the guard axle, and means for positioning the axle in the levers and the levers on the brackets so that the guard normally lies at an angle to the vertical, and will move upwardly and outwardly on meeting an obstruction, as set forth.

2. An anti-splash appliance for a road vehicle wheel, comprising a guard of light sheet material, a flexible rubber flap carried by the guard, and a metal reinforcement bounding the edges of the guard, a two part rotatable axle, the material of the guard passing between the parts, and the whole being riveted together, brackets or supports mounted on a relatively fixed part of the vehicle and extending at their lower ends to the back and front of the wheel respectively, short levers pivotally mounted near the ends of the brackets and carrying the guard axle, a cam or projection on the guard axle, and a stop pin on one of the short levers to cause the guard normally to lie at an angle to the vertical, and allow it to move upwardly and outwardly on meeting an obstruction, as set forth.

3. An anti-splash appliance for a road vehicle wheel, comprising a guard of light sheet material, a flexible rubber flap carried by the guard and a metal reinforcement bounding the edges of the guard, a rigid tapered roll at each end of the guard, a horizontal extension of the guard serving as a top guard, a two part rotatable axle, the material of the guard passing between the parts, and the whole being riveted together, brackets or supports mounted on a relatively fixed part of the vehicle and extending at their lower ends to the back and front of the wheel respectively, short levers pivotally mounted near the ends of the brackets and carrying the guard axle, a cam or projection on the guard axle, and a stop pin on one of the short levers to cause the guard normally to lie at an angle to the vertical, and allow it to move upwardly and outwardly on meeting an obstruction, as set forth.

4. An anti-splash appliance for a road vehicle wheel, comprising a guard of light sheet material, a flexible rubber flap carried by the guard, and a metal reinforcement bounding the edges of the guard, a two part rotatable axle, the material of the guard passing between the parts, and the whole being riveted together, a box or casing carried by a relatively fixed part of the vehicle, springs in said box or casing, brackets mounted on said springs within the casing and extending at their lower ends to the back and front of the wheel respectively, short levers pivotally mounted near the ends of the brackets and carrying the guard axle, a cam or projection on the guard axle and a stop pin on one of the short levers to cause the guard normally to lie at an angle to the vertical, and allow it to move upwardly and outwardly on meeting an obstruction, as set forth.

In testimony whereof I have signed my name to this specification.

ERNEST WILLIAM HAWARD.